Patented Apr. 5, 1938

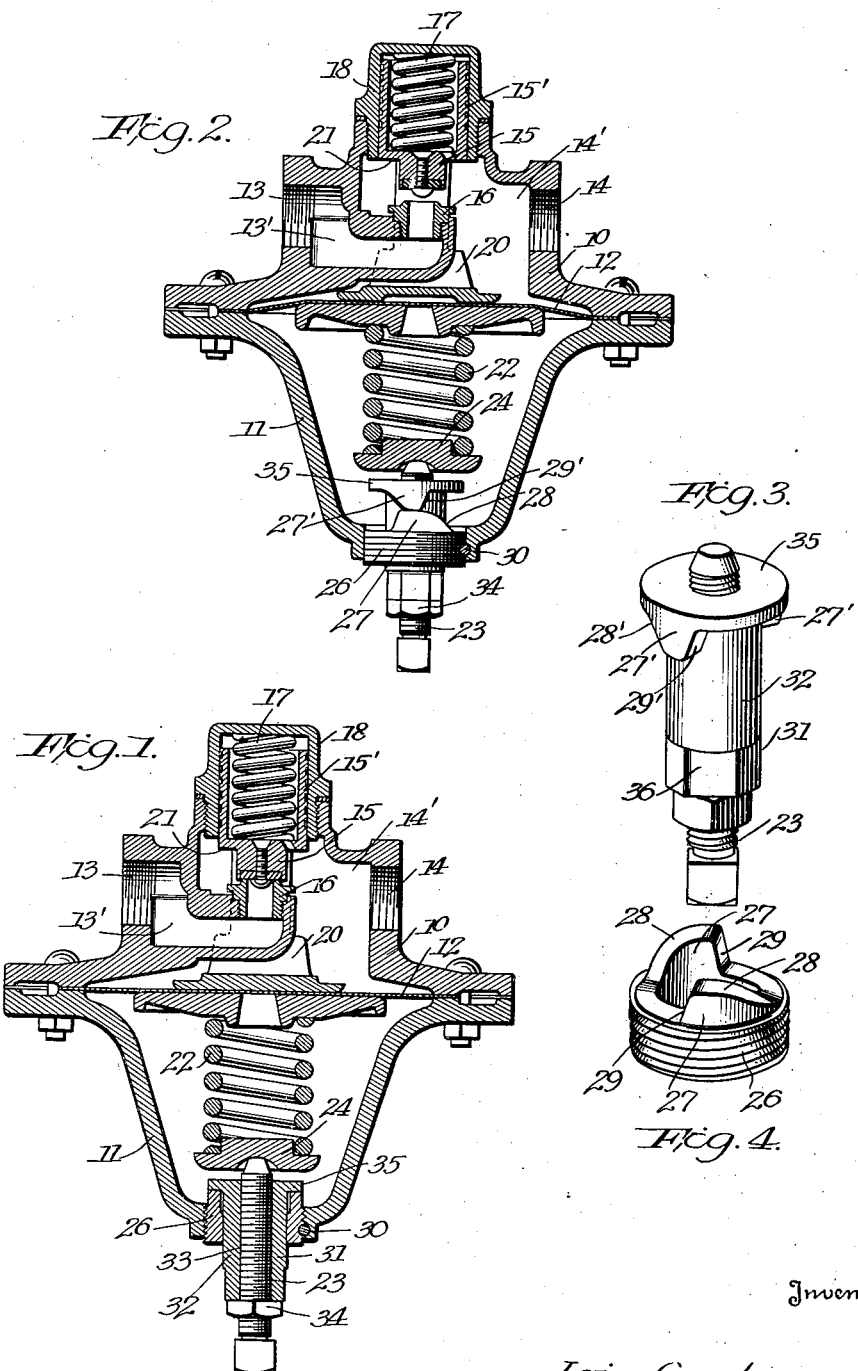

2,113,108

UNITED STATES PATENT OFFICE 2,113,108

FLOW INCREASER FOR PRESSURE REDUCING VALVES

Loie Condé, Decatur, Ill., assignor to Mueller Co., Decatur, Ill., a corporation of Illinois Application July 31, 1934, Serial No. 737,851

8 Claims. (Cl. 50—23)

The present invention relates to pressure reducing valves and has for its object to provide a valve of this character which may be primarily adjusted for normal use, but is provided with mechanism for maintaining the valve in full open position in order to permit the fluid line on the low pressure side of the valve to fill quickly.

In the drawing herewith is shown one form of the invention, but it will be understood that the drawing is illustrative and in no sense restrictive, as the invention may be developed in various mechanical ways.

In the drawing:

Figure 1 is a vertical cross sectional view of the valve in its normal position of operation.

Figure 2 is a vertical cross sectional view of the valve, showing the same in full open position for filling the low pressure side of the system.

Figure 3 is an enlarged perspective view of the adjusting assembly, and

Figure 4 is an enlarged perspective view of the bonnet plug and cam.

Referring to the drawing by numerals, like numerals designating like parts throughout the several views, 10 indicates the valve body member while 11 denotes the valve bonnet, the body member and bonnet being flanged in the conventional manner and secured to one another. A flexible diaphragm 12 is carried between the flanges of the body member and bonnet. The body member is equipped with an inlet or high pressure opening 13 at one side, and with an outlet or low pressure opening 14 at the other side, said inlet and said outlet leading into high pressure and low pressure valve body chambers 13' and 14' respectively. The chambers 13' and 14' are normally isolated from one another by a valve member 15 which seats upon a valve seat 16, said valve member being urged toward its seat by a small valve spring 17, which spring is carried within a cap 18 screwed into the body member. Valve 15 has a valve stem 15' which is cup-shaped and fits closely within the cap 18 surrounding the spring 17. The interior of the valve stem may be connected with the low pressure chamber 14' by a suitable opening, to permit fluid to enter the hollow stem. The valve member 15 is shown resting on its seat in Figure 1, this being the normal position of the device when the valve is in place in the fluid pressure line, and when the low pressure side of the system is filled to the desired pressure.

In order to open the valve to permit replenishing the fluid when a quantity of the same is withdrawn from the system on the low pressure side of the valve, a yoke 20 is provided, said yoke resting loosely upon the diaphragm 12 and having arms which extend around the valve seat and bear against the inner face of the valve stem 15' as at 21. To control movements of the diaphragm and consequently the yoke and valve member, a loading spring 22 is arranged between the diaphragm and an adjusting screw 23 carried at the end of the bonnet, said screw bearing against a follower 24 which is in turn adapted to hold the end of the loading spring. The adjusting screw 23 is arranged to be screwed inwardly and outwardly with respect to the end of the bonnet to compress or release the loading spring 22 to effect a primary adjustment of the valve. In ordinary operation, the tension of spring 22 is so regulated that when the device is placed in the fluid line, the valve member 15 will rest upon its seat under pressure of the valve spring 17 when the low pressure side of the system is filled with fluid to the desired pressure. That is, the combined forces of the valve spring 17 and the pressure of the fluid in the low pressure chamber 14' against the diaphragm will exert sufficient force to move the valve member 15 to its seat against the pressure of the loading spring 22.

When fluid is bled from the system on the low pressure side of the valve, the latter will replenish the system by opening to permit flow from the high pressure side of the valve. This automatic operation is effected by the expansion of the loading spring 22, which is permitted to expand by the weakening of the pressure against the diaphragm in the low pressure chamber 14'. When the valve has opened and sufficient fluid has passed through the valve to build the system on the low pressure side of the valve up to the desired pressure, the pressure in the low pressure chamber 14' will attain such value as to move the valve member onto its seat by moving the diaphragm against the pressure of the loading spring 22.

In some systems, particularly hot water heating systems or the like, it is desirable at certain times of the year to drain the system and refill the same. While operation of the reducing valve as described above would be quite desirable in the line under normal operation, in refilling the system it is convenient to provide for free flow into the system in order to hasten the filling operation. To accomplish this purpose, I have devised the flow increasing device hereinafter described.

The end of the bonnet 11 is centrally apertured and threaded to receive a bonnet plug cam member 26. Referring to Figure 4, it will be observed that the plug member 26 is substantially cylindrical in form, and exteriorly threaded to engage the threaded aperture in the bonnet. The inner end of the plug member carries a pair of similar cams 27, said cams being spaced substantially 180° apart around the inner end of the plug member. Each cam has a gradually ascending way 28 and a steeply descending way 29. The plug member is adapted to be retained fixed in the casing after the valve is assembled by a retaining pin 30.

Referring to Figure 1, an adjusting assembly 31 is adapted to be received within the plug member, the assembly passing through the cylinder formed by the plug member and being adapted for longitudinal sliding and rotating movements with respect thereto. The adjusting assembly, as shown in Figure 3, comprises an outside cam member 32 which is of substantially cylindrical shape to fit within the plug member, and the adjusting screw 23 which engages in a central threaded bore 33 in cam member 32. A lock nut 34 is carried on the adjusting screw 23 to lock the same in place with respect to the cam member 32 when the primary adjustment has been effected. The inner end of the cam member 32 is provided with a flange 35, the lower surface of said flange being provided with cams 27' of proper configuration to cooperate with the cams 27 carried by the plug member. These cams are substantially 180° apart around the flange 35, and have a gradually sloping way 28' for cooperating with the way 28 on the plug member, and with a steeply sloping way 29' to cooperate with the way 29 on the plug member.

When the device is in position for normal operation, as shown in Figure 1, the cam member 32 will be in such relative position with respect to the plug member 26 that the cams 27' will be between or 90° from the cam members 27, so that the respective cam surfaces will not be in cooperating engagement. The adjusting screw 23 will, at this time, be at proper adjustment to control the inlet of high pressure fluid into the line in order to keep the pressure of the system on the low pressure side of the valve at constant value. This is the primary adjustment, and when the same is effected, the lock nut 34 is set up in order to hold the adjusting screw 23 fixed with respect to the cam member 32.

When it is desired to increase the flow through the valve for a period of time, a wrench may be applied to the flattened surfaces 36 of the cam member 32 and a quarter left-hand turn given to the cam member, which will cause the gradually sloping way 28' on the flange of the cam member to ride up onto the sloping way 28 of the plug member and move the entire adjusting assembly including the adjusting screw inwardly to the position shown in Figure 2. Due to the fact that the inner end of the adjusting screw 23 is constantly in engagement with the follower 24, the above described movement will compress the loading spring 22 to a substantial extent, thus moving the valve member 15 from its seat against the fluid pressure on the diaphragm and against the valve spring 17 to open wide the valve for free flow of high pressure fluid into the system. When the low pressure side of the system has filled to the desired pressure, the cam member 32 may be given a quarter right-hand turn in order to relieve the tension on the loading spring 22 and thus restore the valve to its normal condition of operation. It will be noted that the top surfaces of the cams 27 and 27' are horizontal, so that the cam member 32 will remain in its inner position shown in Figure 2 without being manually held. It will be observed that by this arrangement, the flow of fluid to the valve may be increased without disturbing the primary adjustment of the adjusting screw 23, which screw, after the primary adjustment, remains fixed with respect to the cam member 32 and moves with the latter when the flow is manually increased.

If in increasing the flow, the cam member 32 is turned substantially more than a quarter turn to the left, no harm will result, as the cam 27' will be moved beyond the cam 27 and thus fall down the steep side of the latter to restore the valve to normal operating condition.

When the device is in the normal condition shown in Figure 1, and if an inexperienced person turns the cam member 32 to the right, the flow increasing adjustment will not take place, as the cam ways 29 and 29' are too steep to permit the latter to ascend the former. Thus, if an inexperienced person should tamper with the valve, it being well known that the natural tendency is to rotate any fitting to the right, it would not be probable that such person would effect the flow increasing adjustment, because the attempt to turn the cam member 32 to the right would produce no result, unless sufficient force were applied to shear the retaining pin 30, and the wrench used would undoubtedly slip before the shearing of the pin. The left-hand arrangement of the cam ways is also of great convenience in assembling a valve of this construction, in that the adjusting assembly 31 may be fitted within the plug member 26 with the cams in inoperative position 90° apart as shown in Figure 1, and the cam member 32 may then be turned to the right to screw the plug member 26 into the central aperture in the bonnet to the desired extent, after which the same may be fixedly retained by the insertion of the retaining pin 30. During this assembling operation, that is, when the cam member 32 is turned to the right, the cam way 29' will be stopped against the cam way 29, so that the turning movement to the right imparted to the cam member will also turn the plug member to the right to screw the latter into the central aperture in the bonnet.

In assembling the regulator, and before making the primary adjustment by means of the adjusting screw 23, it is desirable to effect a safety adjustment to insure that the regulator will open at very low pressure if the primary adjustment is tampered with or if the primary adjusting screw 23 is entirely removed. This safety adjustment is made with the adjusting screw 23 removed, and is accomplished by screwing in the plug member 26 which will move the cam member 32 and follower 24 inwardly against the pressure of the loading spring 22. It will be apparent that before the adjusting screw 23 is screwed into the cam member 32, the lower face of the follower 24 will rest against the upper face of the flange 35 of the cam member 32. In making the safety adjustment, the valve is arranged on a test stand with the inlet opening 13 connected to a high pressure line, and the outlet or low pressure opening 14 connected with a line which carries a suitable pressure gauge. With the adjusting screw 23 removed, the plug member 26 is screwed into the bonnet 11, which movement will move the cam member 32 with its flange 35 inwardly, and due to the absence of the adjusting screw 23, flange 35 will abut against follower 24 and will move the latter inwardly to compress the loading spring 22. The plug member is screwed into the bonnet 11 until a predetermined low pressure is indicated on the pressure gauge connected in the low pressure side of the line. That is, even with the adjusting screw 23 removed, sufficient pressure will be produced on the loading spring 22 by the plug member 26 to insure that the valve member 15 will be raised from its seat at the predetermined low safety pressure. After the plug member 26 has been threaded inwardly to this position, the retaining pin 30 is inserted to retain the plug member permanently at set position.

After this safety adjustment is accomplished, the primary adjustment is effected as discussed above by screwing the adjusting screw 23 into the cam member 32 until the normal pressure setting is accomplished, which setting will of course be at higher pressure than the safety pressure setting.

It will be obvious from the above that when the regulator is installed in the system in which it is to be used, and if anyone tampers with or removes the adjusting screw 23, the valve 15 will not be held permanently closed, but will be lifted from its seat by the loading spring 22 when the pressure in the low pressure side of the system and in the low pressure chamber 14' drops to the predetermined low safety pressure.

Such departure from the construction herein disclosed as amounts only to mechanical skill, may be made without departing from the range of the invention.

I claim:—

1. In a device of the class described, the combination of a casing having an inlet and an outlet, a valve to regulate flow therethrough, means responsive to pressure in the casing tending to move said valve in one direction, means exerting a predetermined pressure tending to move said valve in the opposite direction, an adjusting assembly including an adjusting screw to primarily adjust the pressure of said predetermined pressure means, and a plug in said casing, said adjusting assembly and said plug carrying cooperating cam faces and cooperating stop faces, relative movement of said cam faces in one direction serving to move said adjusting screw to increase the pressure of said predetermined pressure means, relative movement of said adjusting assembly and said plug in the opposite direction being limited by said stop faces.

2. In a device of the character described, the combination of a casing having an inlet for connection with a source of fluid, an outlet for connection with a fluid system to be controlled, a control valve to regulate flow therethrough, a diaphragm responsive to outlet pressure tending to close said valve, a spring exerting a predetermined pressure against said diaphragm tending to open said valve, means for primarily adjusting the pressure of said spring for the pressure at which said system is to be maintained, and rotatable means for increasing the pressure of said spring when rotated through a certain angle to open said valve to permit free flow of fluid into said system to fill the same, said means being arranged to permit the return of said spring to its primary adjustment pressure when said rotatable means is rotated beyond said angle.

3. In a device of the character described, the combination of a casing having an inlet for connection with a source of fluid, an outlet for connection with a fluid system to be controlled, a control valve to regulate flow therethrough, means responsive to outlet pressure in the casing tending to close said valve, means exerting a predetermined pressure tending to open said valve, an adjusting assembly including an adjusting screw to primarily adjust the pressure of said predetermined pressure means for the pressure at which said system is to be maintained, a cam carried by said casing, a cooperating cam carried by said adjusting assembly, relative movement of said cams in one direction serving to move said adjusting screw to increase the pressure of said predetermined pressure means without disturbing said primary adjustment to open said valve permitting free flow of fluid into the system to fill the same, and means included in said cams for limiting relative movement of said cams in the opposite direction, whereby said valve may be opened for free flow of fluid into the system only by relative movement of said cams in one direction.

4. In a device of the class described, the combination of a casing having an inlet for connection with a source of fluid, an outlet for connection with a fluid system to be controlled, a control valve to regulate flow therethrough, means responsive to outlet pressure in the casing tending to close said valve, means exerting a predetermined pressure tending to open said valve, an adjusting assembly including an adjusting screw to primarily adjust the pressure of said predetermined pressure means for the pressure at which said system is to be maintained, a plug in said casing, said plug carrying a cam, a cooperating cam carried by said adjusting assembly, relative movement of said cams in one direction serving to move said adjusting screw to increase the pressure of said predetermined pressure means without disturbing said primary adjustment to open said valve permitting free flow of fluid into the system to fill the same, and means included in said cams for limiting relative movement of said cams in the opposite direction, whereby said valve may be opened for free flow of fluid into the system only by relative movement of said cams in one direction.

5. In a device of the character described, the combination of a casing having an inlet for connection with a source of fluid, an outlet for connection with a fluid system to be controlled, a control valve to regulate flow therethrough, a diaphragm responsive to outlet pressure tending to close said valve, a spring exerting a predetermined pressure against said diaphragm tending to open said valve, means for primarily adjusting the pressure of said spring for the pressure at which said system is to be maintained, rotatable means within the casing for increasing the pressure of said spring when rotated in one direction to open said valve to permit free flow of fluid into said system to fill the same, and means within the casing for preventing rotation of said last-named means in the opposite direction, whereby said valve may be opened for free flow of fluid into the system only by rotation of said rotatable means in one direction.

6. In a device of the character described, the combination of a casing having an inlet for connection with a source of fluid, an outlet for connection with a fluid system to be controlled, a control valve to regulate flow therethrough, a diaphragm responsive to outlet pressure tending to close said valve, a spring exerting a predetermined pressure against said diaphragm tending to open said valve, an adjusting screw to primarily adjust the pressure of said spring for the pressure at which said system is to be maintained, a cam carried by said casing on the inside thereof, and a cooperating cam within said casing carried by said adjusting screw, said cams providing for free relative rotation in one direction to move said adjusting screw increasing the pressure of said spring to open said valve permitting free flow of fluid into the system to fill the same and limiting relative rotation in the opposite direction, whereby said valve may be opened for free flow of fluid into the system only by relative rotation of said cams in one direction.

7. In a device of the character described, the combination of a casing having an inlet for connection with a source of fluid, an outlet for connection with a fluid system to be controlled, a control valve to regulate flow therethrough, a diaphragm responsive to outlet pressure tending to close said valve, a spring exerting a predetermined pressure against said diaphragm tending to open said valve, means for primarily adjusting the pressure of said spring for the pressure at which said system is to be maintained, rotatable means within the casing for increasing the pressure of said spring when rotated in one direction to open said valve providing for free flow of fluid into said system to fill the same, and being self-locking against rotation in the reverse direction, whereby said valve may be opened for free flow of fluid into the system only by rotation of said rotatable means in one direction.

8. In a device of the character described, the combination of a casing having an inlet for connection with a source of fluid, an outlet for connection with a fluid system to be controlled, a control valve to regulate flow therethrough, a diaphragm responsive to outlet pressure tending to close said valve, a spring exerting a predetermined pressure against said diaphragm tending to open said valve, an adjusting screw to primarily adjust the pressure of said spring for the pressure at which said system is to be maintained, a cam carried by said casing on the inside thereof, and a cooperating cam within said casing carried by said adjusting screw, said cams providing for free relative rotation in one direction to move said adjusting screw increasing the pressure of said spring to open said valve permitting free flow of fluid into the system to fill the same, and providing means upon further relative rotation in the same direction for the return of said spring to its primary adjustment pressure.

LOIE CONDÉ.